United States Patent
Metcalfe et al.

(10) Patent No.: US 6,825,936 B2
(45) Date of Patent: Nov. 30, 2004

(54) HIGH SPEED CAMERA BASED SENSORS (75) Inventors: Leonard Metcalfe, Delta (CA); Cash Reuser, Delta (CA)

(73) Assignee: LMI Technologies, Inc., Delta (CA)

( * ) Notice: Subject to any disclaimer, the term of this patent is extended or adjusted under 35 U.S.C. 154(b) by 440 days.

(21) Appl. No.: 09/931,181

(22) Filed: Aug. 17, 2001

(65) Prior Publication Data

US 2002/0060795 A1 May 23, 2002

Related U.S. Application Data

(60) Provisional application No. 60/227,018, filed on Aug. 23, 2000.

(51) Int. Cl.[7] ............... G01B 11/24; H01J 40/14; H01L 40/14; G06K 9/00
(52) U.S. Cl. ............ 356/602; 250/214 R; 250/559.26; 382/154
(58) Field of Search ................ 356/602; 382/154; 250/559.26, 208.1, 214 R (56) References Cited

U.S. PATENT DOCUMENTS

| | | |
|---|---|---|
| 3,976,384 A | 8/1976 | Matthews et al. |
| 4,188,544 A | 2/1980 | Chasson |
| 4,219,847 A | 8/1980 | Pinkney et al. |
| 4,394,683 A | 7/1983 | Liptay-Wagner et al. |
| 4,606,645 A | 8/1986 | Matthews et al. |
| 4,667,231 A | 5/1987 | Pryor |
| 4,891,772 A | 1/1990 | Case et al. |
| 4,916,629 A | 4/1990 | Bogue et al. |
| 4,937,445 A | 6/1990 | Leong et al. |
| 5,056,922 A | 10/1991 | Cielo et al. |
| 5,252,836 A | 10/1993 | Matthews et al. |
| 5,703,960 A | 12/1997 | Soest |
| 5,717,199 A | 2/1998 | Carbone et al. |
| 5,734,172 A | 3/1998 | Pryor et al. |
| 5,982,393 A | 11/1999 | Forchheimer et al. |
| 6,064,759 A * | 5/2000 | Buckley et al. ............ 382/154 |
| 6,297,488 B1 * | 10/2001 | Beraldin et al. ............ 356/602 |

* cited by examiner

Primary Examiner—Zandra V. Smith
(74) Attorney, Agent, or Firm—Paul Smith Intellectual Property Law; Paul Smith (57) ABSTRACT

Disclosed herein are TV Camera based electro-optical sensors, providing affordable methods and apparatus for high speed determination of dimensions and other features of objects. Preferred embodiments utilize addressable line or pixel based cameras to effect triangulation based and other machine vision sensing of objects.

26 Claims, 7 Drawing Sheets

Digital Pixel Values

HIGH SPEED CAMERA BASED SENSORS

This application claims benefit of U.S. Provisional Application 60/227,018, filed Aug. 23, 2000.

CROSS REFERENCES TO RELATED CO-PENDING APPLICATIONS

Reference is made to U.S. Ser. No. 09/931,179 "High Speed and Reliable Determination of Lumber Quality Using Grain Influenced Distortion Effects", and U.S. Ser. No. 09/931,178 "Method and Apparatus for Scanning Lumber and Other Objects", filed the same day, the disclosures of both of which are incorporated herein by reference.

FIELD OF THE INVENTION

The invention relates to TV Camera based and other electro-optical sensors and systems, providing affordable methods and apparatus for high speed scanning of dimensions and other features of objects.

The invention uses one or more light sources combined with TV cameras which may be randomly scanned in some form, and whose output is used as input to a computer, such as a PC. This data is analyzed to typically provide data concerning the location or dimension of objects or parts of objects and/or the presence or characteristics of certain features of objects.

The invention is particularly useful for applications in which high measurement speed is needed, such as determining the shape of boards moving at high speed on conveyor lines in sawmills. Data taken with such sensors is used to control sophisticated sawing operations aimed at maximizing yield from boards of variant shape, particularly in their edge regions. Utmost accuracy, and high data density are both required, which in turn demands very fast sensing devices, particularly of the triangulation type.

BACKGROUND OF THE INVENTION

Triangulation based sensors have found favor in industry, particularly to date in the Wood processing, Automotive and Electronics industries, and for programmable contouring and robotic guidance in general.

Historic sensor devices employing image scanning based cameras with photodetector arrays to address these industries are typified by Pryor et al: U.S. Pat. No. 5,734,172 entitled Method and apparatus for electro optically determining the dimension, location and attitude of objects (the disclosure of which is incorporated by reference), and other patents by the same inventors. Typically such devices are built with laser light sources, generally semi-conducting diode lasers, which provide cost effective delivery of concentrated optical energy. However, projection of suitable zones onto parts using standard projection optics can also be used, particularly where grid or other two dimensional patterns of zones are employed. Grids can be projected for example by creating same electronically in an LCD or DLP projector, commonly available for power point presentations. Alternatively, a standard slide projector with a Ronchi ruling in place of a slide can be used in some cases.

Further references disclosing triangulation measurements with photo-detector arrays are; U.S. Pat. No. 4,891,772 Case, et al. entitled Point and line range sensors; and Liptay-Wagner et al, U.S. Pat. No. 4,394,683 entitled New photodetector array based optical measurement systems.

In the specific area wood measurement, examples of laser triangulation based sensor units specifically designed for this are Leong et al: U.S. Pat. No. 4,937,445, entitled Apparatus for determining the distances of points on a surface from a reference axis and Cielo et al, U.S. Pat. No. 5,056,922 entitled Method and apparatus for monitoring the surface profile of a moving workpiece, and Chasson, U.S. Pat. No. 4,188,544 entitled Method and Apparatus for Automatically Processing a workpiece employing calibrated scanning.

Speed of data acquisition is critical to many industrial applications. However the sensors described above which are capable of scanning an image in order to determine information concerning the object at high speed, use linear photodetector arrays to achieve the desired speed. This allows only one scan line of potential data to be interrogated, limiting the versatility of the sensor considerably, and increasingly adding extra cost (due to the relative expense of the lower volume linear array devices).

To-date the only known effort to achieve high speed triangulation with matrix arrays has been by IVP corporation, whose commercial literature today addresses a particular method of scanning individual lines of an array and processing onboard . A U.S. Pat. No. 5,982,393 by Forchheimer et al of IVP describes methods by which computing can be done directly on pixel data using processors located on the same image chip, but discloses little about the methods for sensing and processing the data desired. To our knowledge, no other IVP information available to the public exists.

We do not believe the IVP camera is a totally random access camera, but rather a "smart" camera that can select one line (column) and parallel process (thresholding etc.) on every pixel in the line. But it cannot randomly read out a single pixel, which is desirable in many embodiments of our invention.

U.S. Pat. No. 5,717,199 by Carbone et al. discloses methods and apparatus by which data can be read randomly from pixels of a camera, in a manner different than IVP. However, this patent does not disclose methods by which such devices can actually be used to make practical triangulation or other measurements required in industry in an apparatus such as disclosed herein.

SUMMARY OF THE INVENTION

This invention relates to a significant advance over the state of the art in for example, the sensors used in the wood processing business, such as disclosed in Leong et al, Cielo et al, and others for measuring boards moving transversely at the high speeds needed to provide information to real time sawing and other operations in lumber mills.

A preferred embodiment utilizes laser triangulation with one or more points or lines, and specialized camera scanning methods and apparatus to provide meaningful answers as rapidly as possible of the line or point image locations in the field of view of the camera.

The invention particularly concerns the use of random access photo-detector arrays, combined with detection and computational algorithms to increase the speed of triangulation devices 10 to 100 times.

It is noted that in the following discussion, the word "laser" is meant to connote not only the laser device itself of whatever kind (typically a semi-conducting diode laser), but also any associated optics and power sources needed to assure that reliable optical energy can be delivered to a zone on the surface of the object to be measured. Typically, but not necessarily, such a zone is produced by focusing the radiation emanating from the laser to a small zone at the mean point of object location in the laser projection direction. In other cases cylindrical optics are used to create line projections. Optics may be either refractive, reflective or diffractive/holographic in nature.

It should also be noted that light sources other than lasers can be used, such as LEDs. However, laser sources are generally preferable in all applications except where large areas are to be illuminated, such as with structured light grids or other patterns.

The application is particularly, but not exclusively, concerned with sensors using photo-detector arrays with randomly programmable addressing of pixel elements. Increasingly these arrays are made by the CMOS process, but any suitable array with similar random addressing capability such as CCD or CID types can be used. CMOS types are especially attractive as they permit random addressing, and are inexpensive.

GOALS OF THE INVENTION

It is a goal of the invention to provide a sensory device, employing at least one photo-detector array camera operating at the highest possible operational speed, with acceptable accuracy and at reasonable cost.

It is another goal of the invention to provide method and apparatus for selectively analyzing certain portions of an image in order to improve sensor response speed, and for predicting the portions to analyze in the future.

It is another goal of the invention to provide method and apparatus for improving sensor response speed by using low resolution A-D conversion, with a subsequent re-reading of pixel intensity values in the areas of interest.

It is another goal of the invention to provide method and apparatus for selectively on a pixel basis, controlling laser power or integration time.

It is also a goal of the invention to provide a method for increasing the reliability of detection of projected zones on objects with variant reflectance characteristics at different portions of their surface.

It is another goal of the invention to provide method and apparatus for increasing the speed of camera based sensors in determining the location of features in an image.

It is a further goal of the invention to provide means for high speed contouring of objects, especially those moving with respect to a sensor.

PREFERRED EMBODIMENTS OF THE INVENTION

Figure 1A:
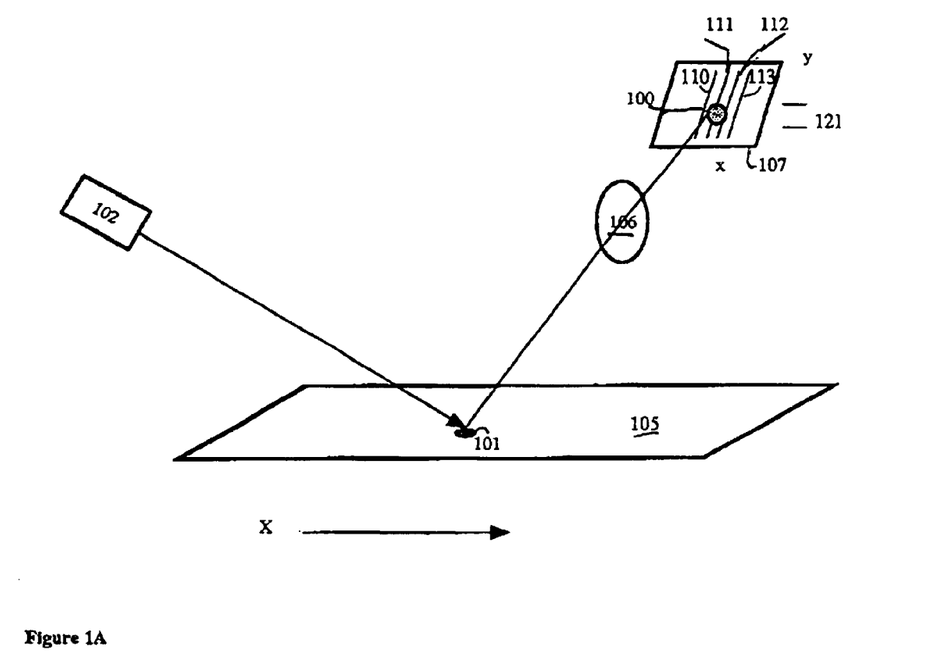
FIGS. 1A–B illustrates pixel addressable triangulation sensor embodiments of the invention employing a spot shaped zone, either circular or elongate.
Figure 1B:
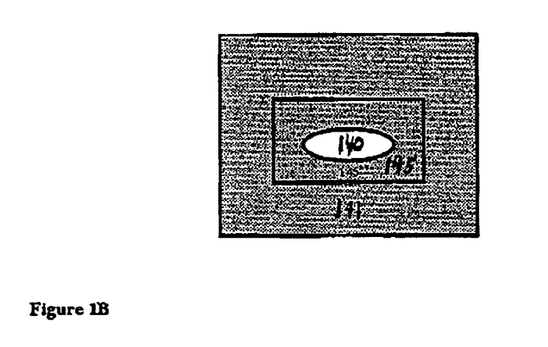

FIG. 1

FIG. 1A illustrates triangulation sensor embodiments of the invention employing a spot shaped zone. For example, consider image 100 of a spot type projected zone 101, projected by laser 102 on object 105, which is imaged by lens 106 on to pixel addressable photo-detector matrix array 107, for example a Photon Vision Systems (Homer, N.Y.) ACS-I active column imager. It is desirable for many applications that the pixels of the array are able to be read in a non-destructive manner, such that one can re-read their values based on intelligence gathered in a first reading. Such readout is relatively common with CMOS type photo-detector arrays, such as those made by Photobit company.

Typically such sensors employ photo-detectors which are photo-detector arrays of either linear or matrix types. Processing to determine zone image position can be using thresholded centroids and multiple centroids as described Pryor et al, derivatives as described in Liptay-Wagner et al, U.S. Pat. No. 4,394,683 entitled New photo-detector array based optical measurement systems, or first moment calculations as described in U.S. Pat. No. 4,219,847 by Pinkney et al. entitled Method and apparatus of determining the center of area or centroid of a geometrical area of unspecified shape lying in a larger x-y scan field, or by any other suitable means.

In the first mode of operation of the instant invention, scan lines of the array are chosen specifically to correspond to the expected location in the x direction of the zone (typically a spot) image across the array. This expected location is advantageously predicted in many instances by determining where the image was on a previous scan, and assuming it is in the immediate vicinity. Or it may be predicted by first determining the location of some other feature on the object, from whence it would be logical to assume the location of the projected zone on the surface to lie.

To detect the zone image, one just has to determine pixel intensities on a few scan lines of the photo-detector array, such as the four scan lines 110–113, in order to characterize the location of the zone in the y direction of the array (the direction of change of zone position with change in board dimension). One can determine the centroid (or other delineator of image location) of the zone image 100 seen on the scan lines, using methods described in the referenced patents above, and if desired, average the results to substantially improve resolution and eliminate errors due to surface condition, as taught in U.S. Pat. No. 4,667,231.

The choice of which lines to scan depends on the zone image location, and thence on the projected zone spacing on the object. Choosing to scan only where zone image information lies, results in a speed advantage, in direct proportion to the number of lines of the array divided by the number only needed to be scanned. In this instant example of two zone images, with 4 lines each needed or desired to find and characterize same, this means that a 1000 line array operating at 10 scans per second, which only needed to scan 4 lines, would be able to run 2500 scans per second.

However it is not necessary to scan the whole line. As shown, the spot image 100 is clearly only located let us say within a pixel band 121, comprising, for example, pixel rows #200 to #230 in the y direction of array. If we can assure the spot is in this band, we only need to scan these pixels in the x direction, to find the zone image. If we thus know that it is within 4 scan lines (of a total say of 1000 in the y direction), and in the x direction within 30 pixels out of say 1000, we then only need scan 33×4 pixels of 1000×1000, or about 1/10,000 of a normal readout of such a 1 "MEGA-Pixel" array. At 10 scans/sec normally, this means that with random pixel addressing, one can readout the pixel intensities at the spot location in 10 microseconds. (in other words a 100 khz update rate).

Figure 4A:
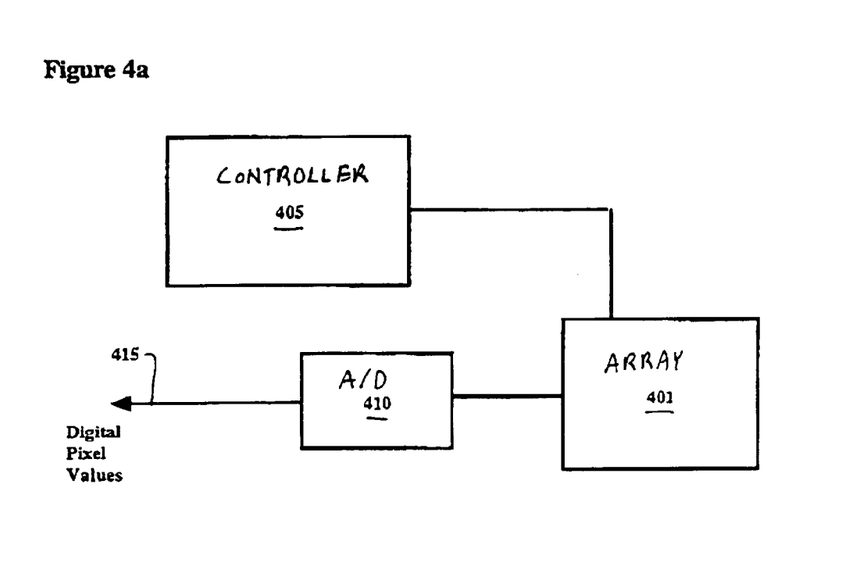
FIGS. 4A–B illustrate a pixel scan and processing embodiment using rough approximations of analog pixel values to increase scan speeds.

This readout can be even faster if one doesn't wait for the A-D device converting the analog pixel intensities to settle. This is discussed in FIG. 4 below.

Its noted that the scanned lines or pixels do not necessarily have to be contiguous in order to allow a zone location determination to be made (via computation of the centroid of intensity or other criteria). This can speed up the rate at which points can be found. In general however, the less pixels operative per zone image, the more reduced the resolution of its location.

Shown in FIG. 1B is an alternate example of an elongate spot zone image, 140 on array 141, in which a window 145 comprising a rectangular matrix of individual pixels are addressed in order to determine the centroid (or other determiner of location) of a single elongate type zone image 140.

If the array is aligned as shown, at different ranges the spot image falls along the same scan lines of the array, since they are parallel to the plane formed by laser projection of the zone and the imaging lens axis.

FIG. 2

Figure 2A:
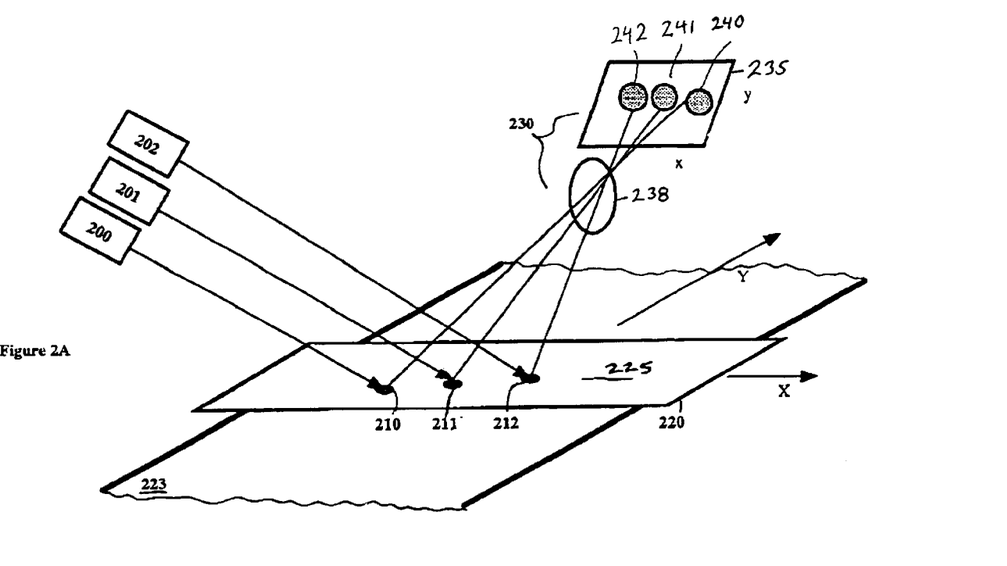
FIGS. 2A–D illustrate pixel addressable triangulation sensor of the invention employing a multi-spot group of zones for board measurement.

FIG. 2A illustrates pixel addressable matrix photo-detector array triangulation sensor of the invention similar to FIG. 1, employing multiple laser sources disposed in the x, or transverse direction to that of a moving object such as a board which it is desired to measure in the profile sections corresponding to the laser beam locations.

As shown, three independent laser sources 200, 201 and 202 direct zones of light, 210–212, in this case spot shaped, at a board 220 as shown, traveling on a chain conveyor 223 in the y direction at 30 inches/second. The zones are in a line, 225, parallel to the long axis (x axis) of the board, and perpendicular to the conveyor flow.

A camera 230, composed of photo-detector matrix array 235 and lens 238 is used to scan the images 240–242 of the zones on the array. Each zone is analyzed for its position on the array as described above, by scanning only certain lines or pixels of the array, thus providing rapid location data of the board with respect to the sensor composed of the laser/camera combination. By taking sequential scans, a complete profile section for the board at each axial zone x location, can be built up during the rapid traverse of the board past the sensor station.

Figure 2B:
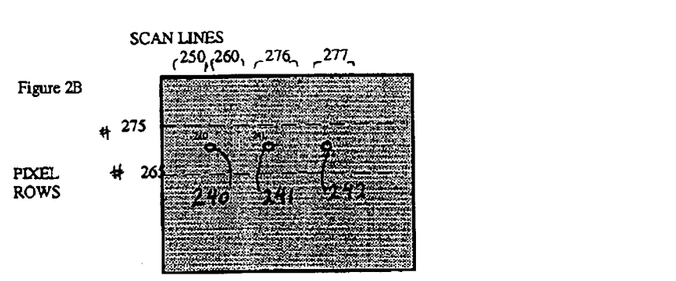

In this particular example, illustrated in FIG. 2B, lines #250–260 of the array were scanned to find one of the zone images, in this case zone image 240 chosen as a master. This image was determined from the scan of these lines, to lie between pixel row locations #265 and 275. Since the board is of reasonably similar shape in the longitudinal (Y) direction of the zones projected along its length, it was determined that the same pixel row data (e.g. between rows 265 and 275) could be scanned to find and determine the zone centroids of the other two zone images 241 and 242. The scan lines used to find the other two images are constant in bands 276 and 277, each of which could also be chosen for example to be 10 scan lines wide.

Figure 2C:
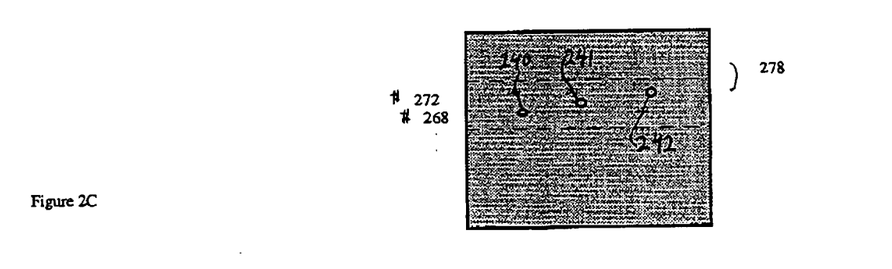

In another representative example, shown in FIG. 2C, the centroid of the zone image of 241 was found to lie at a location centroid on pixel row 272, where as 240 was on 268. Since the board was assumed linear, but in this case tilted with respect to the camera, or the conveyor or both, the third zone image was determined by scanning a different set of pixels in the y direction, predicted by the slope between 240 and 241, and represented by band 278. Thus knowledge of some results in the image can be used to govern the scan of further data of an image—even in the same camera scan.

It can also affect sequential scans. For example if the zone image positions are moving with time in a monotonic way, this could indicate a change in board thickness occurring. The pixels interrogated for further boards could accordingly be chosen differently and predicted as a result of the instant board pixel centroid location.

Figure 2D:
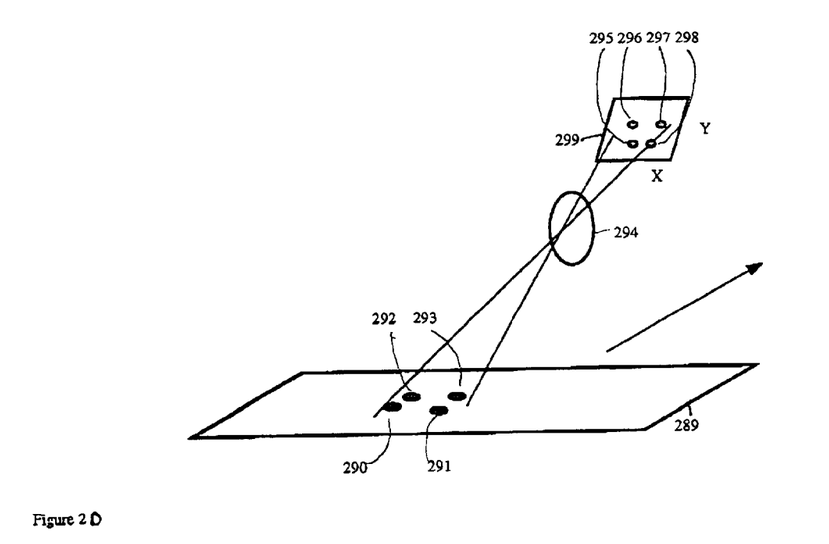

FIG. 2D illustrates another situation where a rectangular matrix of points 290–293 are projected (by projection source not shown) on a board 289, forming, using lens 294, zone images 295–298 on photo-detector array 299. Each of the board locations corresponding to the points 290–293 can thus be determined by triangulation through interrogation of the location of the corresponding zone images on the array. The projected grid of points can be other that the square grid of round zones shown, for example lines of rectangular shaped zones.

In the case of an object, such as a board or other objects which do not vary much across their surface, the location of image points in both directions is approximately known, thus allowing the scanning of pixels to be contained to only certain regions of the array on any one scan.

Figures 3A, 3B:
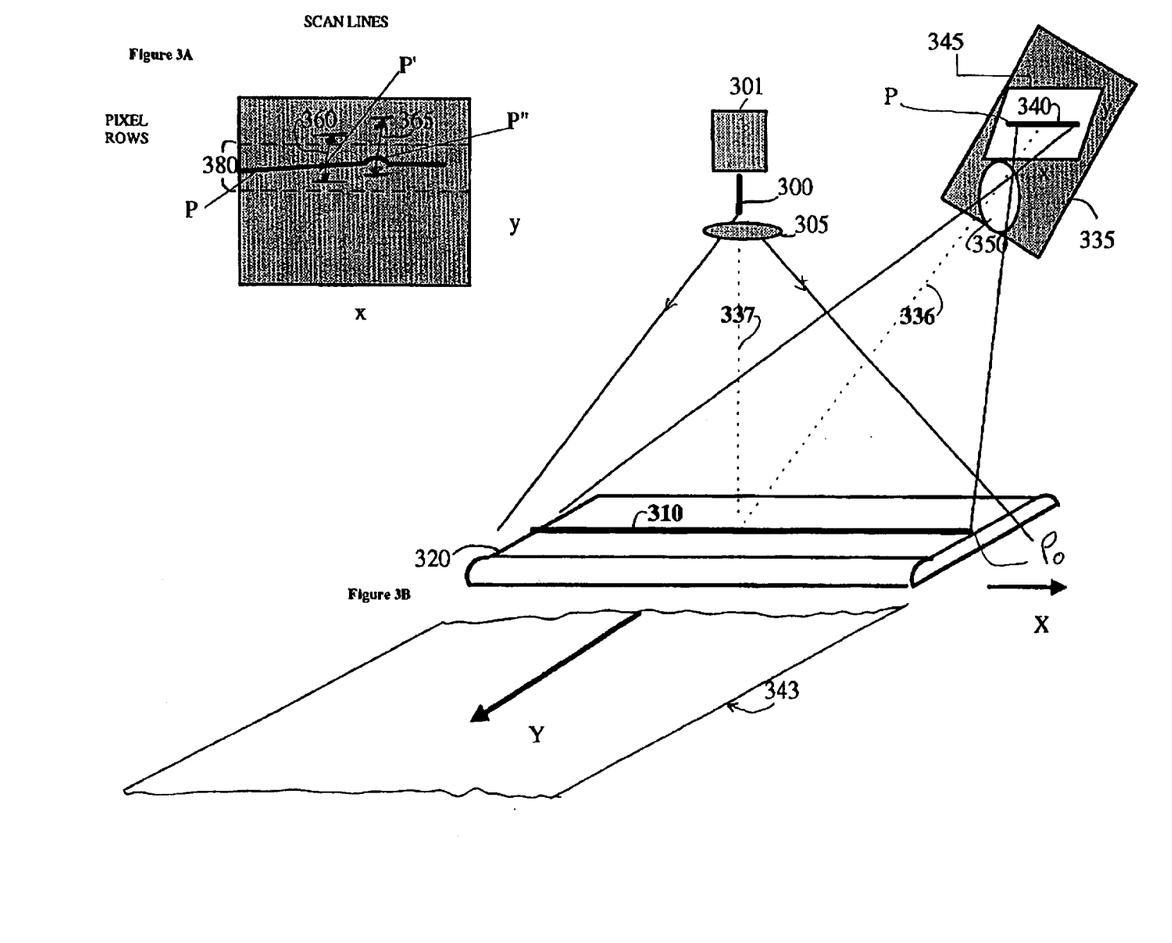
FIGS. 3A–C illustrate pixel addressable triangulation sensor of the invention employing a line zone or a multi-line group of zones.
Figure 3C:
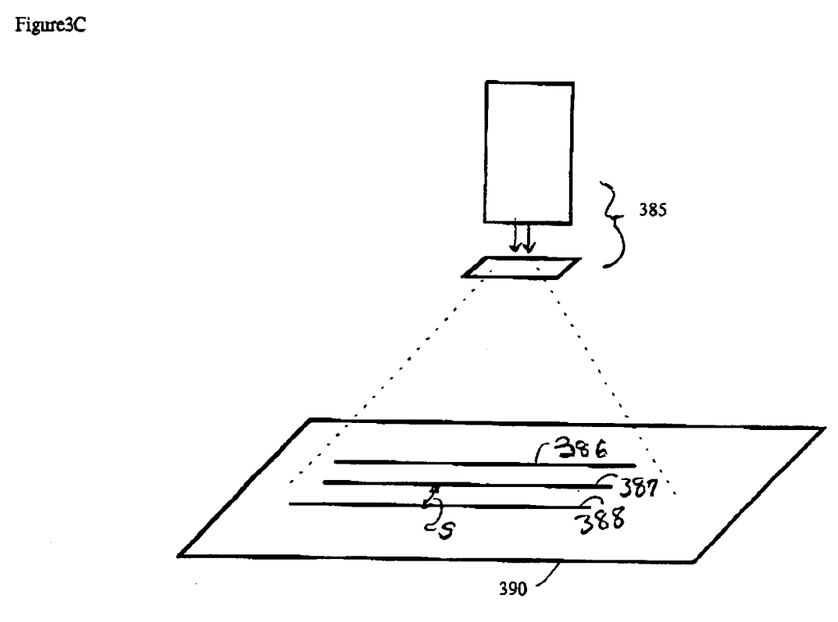

FIG. 3

FIG. 3B illustrates pixel addressable triangulation sensor of the invention employing a line laser source and a single array. As shown laser beam 300 from laser 301 is expanded in to a fan by cylindrical optical element 305 (refractive, reflective or diffractive, as desired) to form a line, 310, disposed longitudinally in the X axis down the long axis of a board 320 moving transversely in Y, typically by movement of a chain conveyor such as 343. Typically the angle of the fan is such, that the light falls off the end of the board in both directions—except when multiple sensors of the type shown are employed to cover very long boards (see for example FIG. 7 of U.S. Ser. No. 09/931,178 "Improved method and apparatus for scanning lumber and other objects", filed the same day, the disclosure of which is incorporated herein by reference).

An addressable matrix array camera 335 of the invention has its optical axis 336 oriented at an angle theta to the projection axis 337 of laser radiation, and is used to sense the image 340 formed of line 310 on the board. Such a system is capable of generating a large number of points along the line very quickly—the number equal, if desired, to the number of pixel lines in the array in the x direction, assuming the data as to line centroid location at a given x location on the board can be achieved rapidly.

This can be preferably achieved though apriori knowledge of line location, realizing that the centroid of the line in the y direction is similar in nature to that of the spot centroids discussed above. Indeed the line is in some regards, just a succession of spots, which like the spots, give range to the object from knowledge of their y axis centroids or other parameters and any given x location along the array or the object (which is mapped onto the detector array 345 by the lens 350 of the camera).

The first example of intelligent processing is to find the edge of the line, or any other position such as the line location in the center of the array, and from there simply move to adjacent points in succession, using the change from one point to the next to predict where a subsequent point should likely be. For many objects with smoothly changing surfaces, this is a monotonic function.

With reference to the expanded view of FIG. 3A, an algorithm I have found useful is to look for the edge "P" of the line image 340 on array 345, as shown, corresponding to the edge Po on the board object. Then once found, say to lie in a band of pixels of width in the pixel row direction 380, (typically centered on point P and the row of pixels represented by it at that moment), we need only look for other points such as P' which lie with in this band—assuming the object is of relatively flat shape. Note that in this case the camera has been aligned such that the pixel rows are generally parallel to the typical undisturbed board surface and to the conveyor. It can be appreciated that if such is not the case, that mathematical alignment in the readout computer can be used to normalize to this condition.

If the shape is less known, the band of scanned pixels can be centered on the last point on the line identified, which is not thought to be too far from the point immediately desired. Thus the band at instant point P' would be as shown 360, where as at P", the band to be interrogated would be 365.

If the line is reasonably monotonic, such a strategy works well. If the slope or some other characteristic can be predicted from one or more previous results, this information can be used to predict the desired band of future pixel interrogation at another point on the line. This same argument holds for changes in time as the object moves relative to the sensor.

It should also be noted that one can also project multiple lines, as shown in FIG. 3C, in a manner related to the multi-point group of zones of FIG. 2B. In this manner a complete grid of points on the object surface can be acquired simultaneously if desired. In this case a cylindrical fan multi-line projector 385 such as made by Lasiris company is used, projection 3 lines 386–388 as shown on object 390. The grid spacing is the separation s of the lines projected. FIG. 4

FIG. 4A illustrates another pixel scan and processing embodiment using rough approximations of analog pixel values to increase scan speeds. As shown an addressable matrix array 401 of the invention is controlled by scan controller 405 to read out the analog voltages of each pixel commanded by the controller. The pixel voltages are fed to A-D converter 410 and processed to get 12 bit (246 point dynamic range) digital values 415 for each of the pixel locations read. By allowing the A-D to settle such a result typically takes 100 nanoseconds.

The invention however, comprehends a rough image location step which can be used to speed the process. For example, if we read the conversion value before complete settling takes place, we may only get 8 bit resolution of pixel detected light intensity, but we can complete the process in 40 nanoseconds—an important 2.4× speed improvement.

For applications in which a substantial number of pixels are used to calculate a centroid location, the reduction in intensity digitization accuracy may not result in significant reduction in centroid location accuracy. And even where it might, the invention comprehends a first scan step to locate the zone image, using a reduced resolution of 8 or even 6 bits, followed by a subsequent scan if desired at the full resolution. But this scan would only be of substantially the identified pixels from the first scan at which the zone was found to lie. If the larger initial scan field was much larger than the ultimate zone image scan area, the speed improvement can still be 2× or more under the 8 bit scenario example above.

Figure 4B:
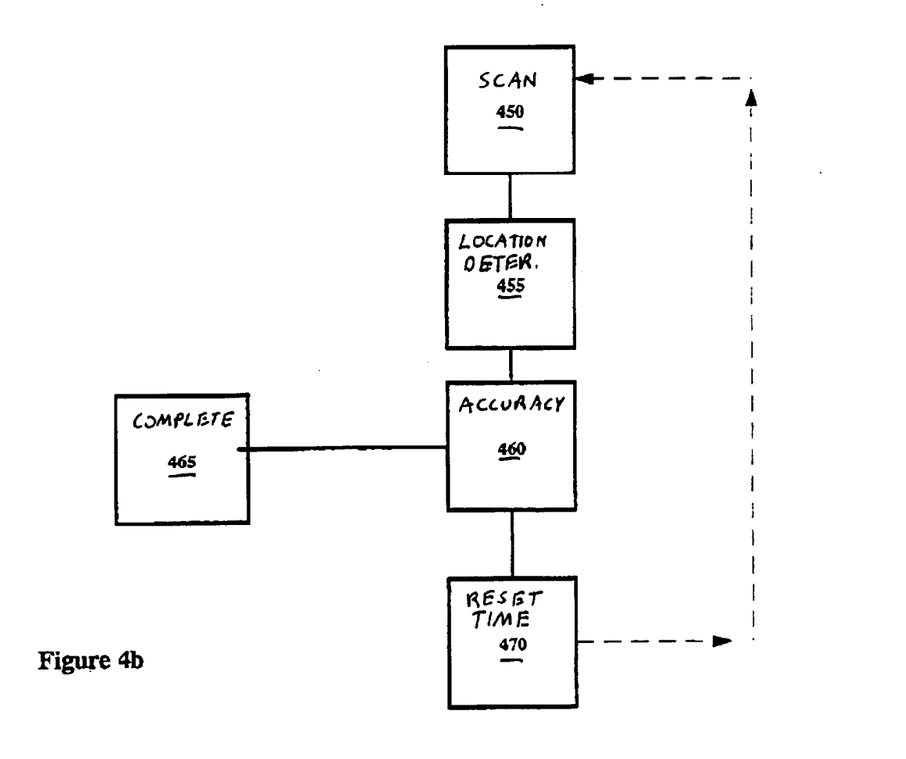

This is illustrated in FIG. 4B, where in step 450 the desired pixel elements of the photodetector array are scanned with a settling time less than the optimum desired. In step 455, the location of a desired projected zone or natural object feature image is determined, by whatever means is practicable. In step 460, a determination of accuracy of the determination is made. If accuracy is sufficient the process of step 465 is complete for this scan, and the reading transmitted to a host device. If accuracy is not sufficient, settling time is reset to a longer time in step 470, and the process repeated, with a longer settling time used. With some D–A conversion devices, rescan is not needed, and the result just taken from the same D–A signal at a later (and more settled) time.

Figure 5:
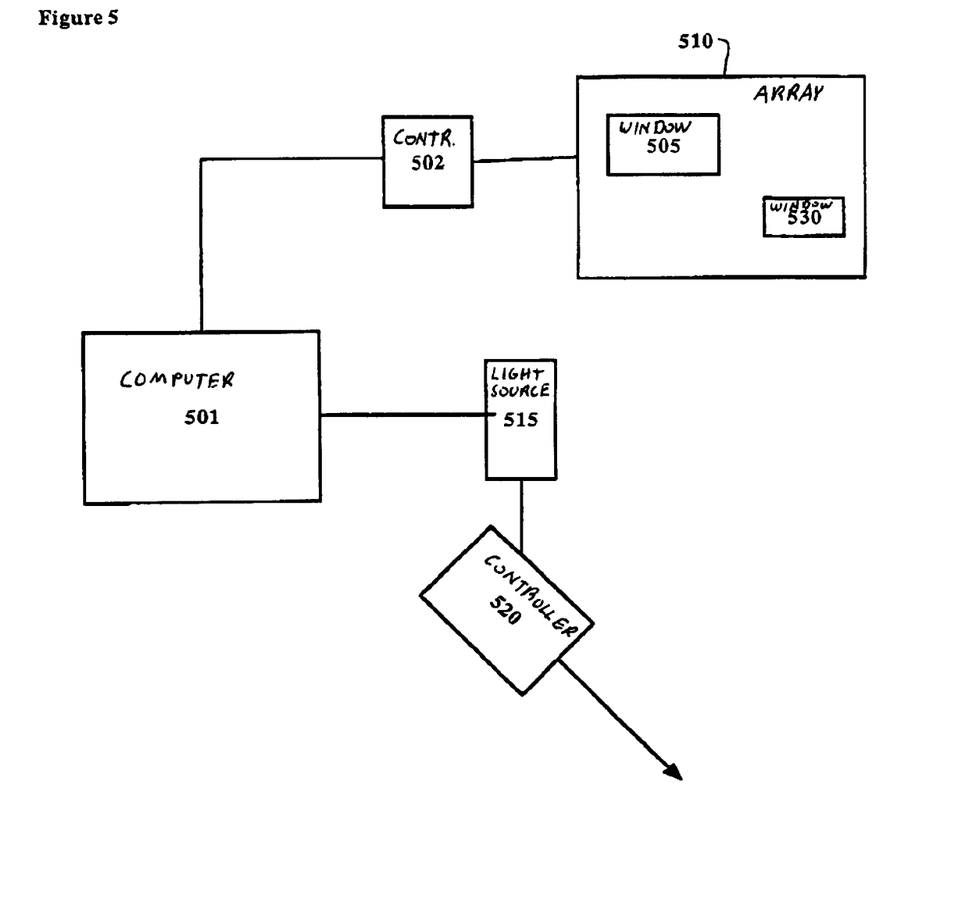
FIG. 5 illustrates methods to control sensor characteristics such as light power, exposure or data density.

FIG. 5

FIG. 5 illustrates methods to control sensor characteristics such as light power, exposure or data density.

In addition to scan issues, it should be noted that sometimes severe lighting problems can occur, due to the reflection of the incident light from the part, both due to the angle of reflection from the surface with respect to the camera, and the sometimes discolored nature of the object surface. In operation of such sensors, it is desirable to control the control the light power and or the array integration time to give the best performance in all the regions of interest in the image. This can be varied on a sectional basis by choosing which lines are used to provide data to set the laser power, or by using data from one section or one line of scan to provide integration time for the next, or for a rescan of the same line.

FIG. 5 illustrates pixel addressable camera further incorporating means to control sensor characteristics such as light power, exposure or data density. As shown, the computer 501 commands via camera controller 502 the reading of pixels in window 505 of addressable photodetector array 510. The pixels in this window are used as the reference pixels from which to calculate light intensity, and thus integration time for the next scan of the array, and/or to set the power or duration of light source (laser or other) 515 via light source controller 520. The window can be rectangular, square, circular, or any shape desired. In an extreme case, even one pixel can be used to effect such control.

In many cases lighting varies considerably through the complete image. For example, in the line image of FIG. 3, it is commonplace on highly curved objects to have much more light in one area than another. Since the ratio of such light intensity is typically much the same from part to part, the integration time of readout of pixels say in a second window 530, can be set differently than that of window 505, in order to keep the light intensity within the operable limits of the photodetector array.

In one embodiment, an integration period is started at time zero, with the window 505 read first at time T1 since the surface reflects more in this region, and then at time T2 the pixels in window 530, covering a different region of interest in the image are read after they have had more time to integrate light on their surface, or on capacitors or other electrical devices connected therewith.

In the case where the light intensity provided by light source 515 is controllably increased (or decreased), under control of power source 520 (itself under control of computer 501), a similar tack can be taken. In a first example, as the light is increasing, information in the first window 505 is read, since the surface reflects more in this region. Then as the light approaches a maximum value of surface irradiation, information in a second window 530, for example, can be read. Multiple windows can be employed in this manner to optimally take data from all parts of the image as desired.

It is noted that where color filters or polarizing filters are used on such arrays, it is possible to address specific colors or polarizations randomly.

It is also noted that summing of multiple frames each individually taken at different exposure times or illumination light intensities (or both) can be used to achieve wider dynamic range when imaging varying target surfaces, which using the invention can be rapidly examined in the areas of interest desired.

What is claimed is:

1. An improved method of triangulation comprising the steps of:
   providing an addressable matrix array type TV camera capable of scanning individual pixels or groups of pixels;
   providing an image on said array indicative of a location of at least one illuminated zone on an object to be measured;
   scanning a limited number of pixels of said matrix array to determine image data relating to said zone, wherein the pixels to be scanned are selected based on knowledge of data from pixels previously scanned during the scanning said object; and
   from said data determining dimension or location of said object.

2. A method according to claim 1 wherein said zone is provided by a laser.

3. A method according to claim 1 wherein the choice of pixel data of said array to be scanned is based on knowledge of image data taken on a previous scan.

4. A method according to claim 1 wherein the image data of said array is acquired at higher resolution than data acquired from a previous scan.

5. A method according to claim 4 wherein higher A-D resolution is used.

6. A method according to claim 4 wherein higher pixel density resolution is used.

7. A method according to claim 1 including the further step of controlling the illumination energy of said zone using said image data.

8. A method according to claim 1 including the further step of controlling the integration time of said pixels using said image data.

9. A method according to claim 1 wherein the choice of pixel data of said array to be scanned is based on knowledge of image data at another location in said image.

10. An improved triangulation sensor for measuring location or dimension of an object, comprising:
    an addressable matrix array type TV camera capable of scanning individual pixels or groups of pixels;
    a light source means for illuminating at least one point on an object;
    lens means to provide an image on said array indicative of a location of at least one illuminated zone on an object to be measured;
    means for scanning a limited number of pixels of said matrix array to determine image data relating to said zone, wherein the pixels to be scanned are selected based on knowledge of data from pixels previously scanned during the scanning of said object; and
    means for analyzing said data to determine location or dimension of said object.

11. Apparatus according to claim 10 wherein said light source is a laser.

12. Apparatus according to claim 10 wherein the choice of pixel data of said array to be scanned is based on knowledge of image data taken on a previous scan.

13. Apparatus according to claim 10 wherein the pixel data of said array is acquired at higher resolution than previous data.

14. Apparatus according to claim 13 wherein higher A-D resolution is used.

15. Apparatus according to claim 13 wherein higher pixel density resolution is used.

16. Apparatus according to claim 10 including the further step of controlling the illumination energy of said zone using said image data.

17. Apparatus according to claim 10 including the further step of controlling the integration time of said pixels using said image data.

18. Apparatus according to claim 10 wherein the choice of pixel data of said array to be scanned is based on knowledge of image data at another location in said image.

19. An unproved method of triangulation sensor operation comprising the steps of:
    providing an addressable matrix array type TV camera capable of scanning individual rows or columns;
    providing an image on said matrix array indicative of a location of at least one zone projected on an object to be measured;
    scanning a first plurality of rows or columns of said array to determine first image data, said first plurality being less than the total number of rows or columns;
    using said first image data, scanning a second plurality of rows or columns of said array to determine second image data, said second plurality being less than the total number of rows or columns, to determine from said second image data the location of a second point of interest; and
    from said second image data, determining range to an object at said at least one position on said object.

20. A method according to claim 19 wherein said second image data relates to data from a different position on said object than said first image data.

21. A method according to claim 20 wherein said second image data relates to data from a different object than said first image data.

22. A method according to claim 21 wherein said second image data is acquired at higher resolution than said first image data.

23. A method according to claim 22 wherein said second image data resolution is improved in density of pixels.

24. A method according to claim 23 wherein said second image data resolution is improved in analog to digital conversion of pixels.

25. A method according to claim 24 wherein one or more individual pixels in a column or row are addressed, without interrogating a complete row or column.

26. An improved method of triangulation comprising the steps of:
    providing an addressable matrix array type camera capable of scanning individual pixels or groups of pixels;
    in the course of scanning an object to be measured, providing an image on said array indicative of at least one zone on said object;
    reading out the values of less than all pixels of said matrix array to determine image data relating to said zone, the pixels whose values are to be read being selected based on knowledge of data from at least one pixel whose value was previously read during the scanning of said object; and
    from said data determining a dimension or location of said object.

* * * * *

UNITED STATES PATENT AND TRADEMARK OFFICE
CERTIFICATE OF CORRECTION

PATENT NO. : 6,825,936 B2
DATED : November 30, 2004
INVENTOR(S) : Leonard Metcalfe and Cash Reuser It is certified that error appears in the above-identified patent and that said Letters Patent is hereby corrected as shown below:

Column 10,
Line 12, replace "unproved" with -- improved --.

Signed and Sealed this

Twenty-ninth Day of November, 2005

JON W. DUDAS
*Director of the United States Patent and Trademark Office*